US007646151B2

(12) United States Patent
Böröczki et al.

(10) Patent No.: US 7,646,151 B2
(45) Date of Patent: Jan. 12, 2010

(54) LIGHT SOURCE MODULE

(75) Inventors: Ágoston Böröczki, Budapest (HU); László Balázs, Budapest (HU); Róbert Baranyi, Budaörs (HU)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 11/347,998

(22) Filed: Feb. 6, 2006

(65) Prior Publication Data

US 2007/0182302 A1 Aug. 9, 2007

(51) Int. Cl.
*B60Q 1/02* (2006.01)
*H01J 5/54* (2006.01)

(52) U.S. Cl. .................... 315/82; 313/113; 313/318.05; 362/296.01

(58) Field of Classification Search ................. 313/113, 313/318.03, 318.05, 318.02, 318.09, 318.11; 315/58, 76, 77, 82, 84; 362/296.01, 310, 362/341
See application file for complete search history.

(56) References Cited

U.S. PATENT DOCUMENTS

| | | | | |
|---|---|---|---|---|
| 5,115,381 | A * | 5/1992 | Van Heeswijk | 362/519 |
| 5,945,776 | A * | 8/1999 | Koster et al. | 313/113 |
| 6,504,323 | B2 * | 1/2003 | Yuda et al. | 315/307 |
| 6,536,918 | B1 * | 3/2003 | Boroczki et al. | 362/263 |
| 6,860,776 | B2 | 3/2005 | Kai et al. | |

* cited by examiner

*Primary Examiner*—Douglas W Owens
*Assistant Examiner*—Jimmy T Vu
(74) *Attorney, Agent, or Firm*—Fay Sharpe LLP

(57) ABSTRACT

There is disclosed a light source module comprising a high intensity discharge light source; optical elements including at least a reflector for redirecting and focusing the light emanating from said light source; and electronic elements for supplying said light source with voltage and current of a predetermined waveform and magnitude. The light source may have optical and/or electric parameters at least partially different from optical and/or electrical standard parameters of a light source of identical type. In order to provide a predetermined illuminating beam pattern compatible with the standard, the optical and/or electronic elements are adjusted to the optical and/or electrical parameters of said light source.

26 Claims, 7 Drawing Sheets

LIGHT SOURCE MODULE

BACKGROUND OF THE INVENTION

This invention relates to a light source module, more particularly to a light source module for projecting a predetermined beam pattern.

The use of low wattage high intensity discharge (HID) lamps for automotive forward lighting is well established. All of the major lighting companies have such products in the market place. These types of lamps have been introduced in the automotive market in recent years and offer more light on the road for improved nighttime visibility. The increasing popularity of HID lamps results from the advantageous properties of these lamps compared to previous filament lamp. HID lamps have lower power consumption, higher luminosity and a longer lifetime than conventional filament lamps. High intensity discharge lamps have a very small size with a small discharge volume with electrodes extending into the discharge volume. The arc gap between the electrodes inside the discharge volume is only 3-4 mm. Therefore such HID lamps may be regarded as point-like light sources. If HID lamps are implemented in an automobile headlamp, special care has to be taken in order to provide for the required illumination pattern and to avoid glaring effect. The illuminating beam pattern of automotive headlights using gas-discharge light sources is determined by UN standard E/ECE/324 Addendum 97: Regulation No. 98 comprising uniform provisions concerning the approval of vehicle headlamps equipped with gas-discharge light sources. This standard has to be applied by all manufacturers who produce complete lamp assemblies. In order to meet the requirements set by the standard, the HID light sources have to be positioned and fixed very precisely relative to the reflecting mirrors. This requires exceptionally high accuracy for interfacing the light source and the reflector of each headlamp assembly.

U.S. Pat. No. 6,860,776 discloses a method for producing a lamp unit for an automobile headlight including a high pressure discharge lamp set and fixed to a reflecting mirror. In this method, the light emitted by a point-like light source (HID lamp) and reflected at a reflecting surface of the reflecting mirror is detected in order to determine a position for setting and fixing the light source. The position for setting and fixing said light source is defined by a position of the point-like light source, in which the reflected light is the maximum. In this way, a focal point of an elliptical mirroring surface can be found and the point-like light source may be positioned and fixed at this point. Lamp units assembled this way will have a maximum of output light intensity but will not necessarily fulfill any of the requirements set in existing standards.

Due to the diverse technologies incorporated in an automotive headlamp, e.g. lamp, electronics and optics technologies, most manufacturers produce only a part of the headlamps representing a technology. Then these main parts have to be assembled at another manufacturer. In order to meet the requirements for providing a predetermined beam pattern defined by the above standard, all main parts manufactured individually are standardized as well. UN standard E/ECE/324 Addendum 98: Regulation No. 99 comprises therefore uniform provisions concerning the approval of gas-discharge light sources for use in lamp units of power-driven vehicles. This standard makes provisions in order to define tolerances of the geometry, color, switch-on and switch-off behavior and intensity of gas-discharge light sources. The governing idea was that if all of the main parts of an automotive headlamp meet the requirement of these international standards, the assembled headlamp would also provide an illuminating beam pattern according to the above-mentioned standard. In practice however, implementation of this is not easy or requires high precision manufacturing, which results in high costs. It frequently occurs that the individual parts do not meet all requirements of the standards and even if the individual parameters are within the prescribed range, the resulting headlamp may have a light beam pattern, which does not meet the provisions of the standard due to assembling failures or coincidence of extreme tolerances. U.S. Pat. No. 5,945,776 issued to Koster et al. discloses a motor vehicle headlamp having a lamp aligned in a reflector with standard parts and suggests the use of special reference means on the reference surfaces in order to accomplish proper optical alignment.

Contemporary HID automotive headlamps have three main components that are standardized and optimized independently. These are the HID light source, its driving electronics and the optics reflecting and focusing the beam. Optical alignment of the arc position inside the HID light source, as well as positioning of the elements of the optical system, such as lenses, baffles, apertures is done independently, so that variability in light source and optics geometry affects final beam performance of the headlamp considerably.

Due to the standardized light source, no revolutionary optical approaches can be used in the design of projecting optics; in this way efficiency of the optical system is moderate and frozen according to the technology available at the time of standardization. The design of driving electronics is also closely coupled to the characteristics of the standardized light source used in the headlamp, and small deviations in light source characteristics of different manufacturers within the limits of standards cannot be handled by the system, which may cause system reliability problems. Due to the limitations in the designs of the individual components, and little variability allowed by the standards, cost of the contemporary headlamp is high, and its performance is also highly limited. Replaceable concept of interfacing of the individual components reduces system reliability. In case of failure no safe method exists to judge if reliability of other components are affected or not. In order to gain market share for the HID headlamp units in vehicle related or any other applications the cost of the system has to be considerably reduced, and its reliability increased.

There have been some approaches to increase system compactness and reliability of an HID headlamp system. D1 type lamps already include the igniter part of the driving electronics in the base portion of the HID light source. However, interfacing and statistical variability problems, as well as limitations for cross optimization are not solved by this approach either. The overall performance of the system remained basically unchanged, and a further increase of costs rather than cost reduction can be observed.

Thus there is a particular need for an HID headlamp system, in other words an HID Light Source Module (HID LSM), in which an HID light source, its driving electronics and elements of a projecting optical headlamp form a complex system, the elements of which do not necessarily comply with all of the requirements of the special standards for these elements, which however generates a predetermined projected beam pattern in the space or on the surface to be illuminated. The predetermined beam pattern may be a projected beam intended for automotive use, i.e. a beam pattern according to regulation R98, regulations defined for Advanced Forward Lighting applications, fog lamp standards, etc; for any other vehicle related applications including airborne or nautical ones, search light, working light or any other auxiliary beam illuminator applications, optical fiber pumping, or commercial lighting applications.

SUMMARY OF THE INVENTION

In an exemplary embodiment of a first aspect of the invention, there is provided a light source module comprising a high intensity discharge light source; optical elements including at least a reflector for redirecting and focusing the light emanating from said light source; and electronic elements for supplying said light source with voltage and current of a predetermined waveform and magnitude. The light source may have optical parameters at least partially different from and electrical parameters compatible with standard parameters of a light source of identical type. The optical elements are adjusted to the optical parameters of said light source so that the light source module provides an illuminating beam compatible with the standard.

In an exemplary embodiment of a second aspect of the invention, there is provided a light source module comprising a high intensity discharge light source; optical elements including at least a reflector for redirecting and focusing the light emanating from said light source; and electronic elements for supplying said light source with voltage and current of a predetermined waveform and magnitude. The light source has optical parameters compatible with standard parameters of a light source of identical type. The electrical parameters of the light source may be at least partially different from standard parameters of a light source of identical type. The electronic elements are adjusted to the electrical parameters of said light source so that the light source module provides an illuminating beam compatible with the standard.

In an exemplary embodiment of a third aspect of the invention, there is provided a light source module comprising a high intensity discharge light source; optical elements including at least a reflector for redirecting and focusing the light emanating from said light source; and electronic elements for supplying said light source with voltage and current of a predetermined waveform and magnitude. The optical and electrical parameters of the light source may be at least partially different from standard parameters of a light source of identical type. The optical elements are adjusted to the optical parameters of said light source and the electronic elements are adjusted to the electrical parameters of said light source so that the light source module provides an illuminating beam compatible with the standard.

The disclosed HID lamp system has several advantages over the prior art. The HID light source in the unit is neither necessarily replaceable, nor necessarily standardized according to R99 or any other existing HID lamp standard. The three elements of the system, the HID light source, the optics and the electronics, are optimized together as a complete system in order to produce improved projected beam performance and to reduce cost of the system considerably. The proposed HID LSM can be installed in automotive headlamp units, working area beam illuminators, or any other lighting units fitted to a specific lighting application, and potentially includes additional components for auxiliary functions to provide application flexibility.

BRIEF DESCRIPTION OF DRAWINGS

Further aspects and advantages of the invention will be described with reference to the enclosed drawings, in which.

DETAILED DESCRIPTION OF THE INVENTION

Figure 1:
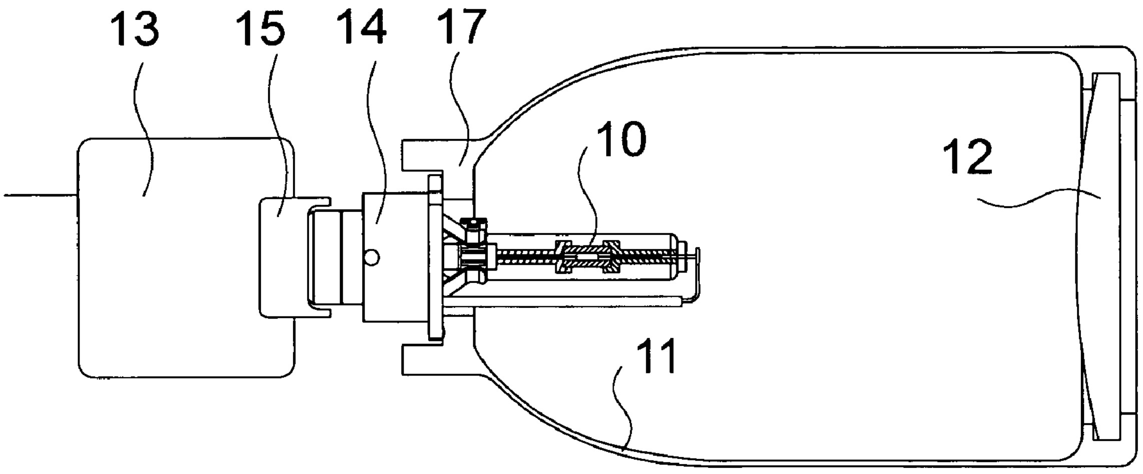
FIG. 1 is a partly cross sectional side view of a HID light source module with a replaceable HID light source with a standard base and non-standard optical parameters.

In all of the embodiments shown in FIGS. 1 to 14, there is shown an HID Light Source Module comprising an HID light source, electronic elements and an optical unit. The HID light source has optical and/or electric parameters, which may be at least partly different from standard parameters of an HID light source of identical type. In order to provide however a predetermined illuminating beam pattern, the optical and/or electronic elements connected to the HID light source are adjusted to the optical and/or electronic parameters of the HID light source. The HID light source module generates a predetermined projected beam pattern in the volume or on the surface to be illuminated. The predetermined beam pattern may be a projected beam intended for automotive applications, i.e. in accordance with regulation R98, regulations defined for Advanced Forward Lighting applications, fog lamp standards, etc., any other vehicle related applications including airborne or nautical ones, search light, working light or any other auxiliary beam illuminator applications, optical fiber pumping, or commercial lighting applications.

The HID light source is neither necessarily replaceable, nor necessarily standardized in accordance with R99 or any other existing HID lamp standard. The HID light source comprises an arc tube made of translucent or transparent ceramic material, e.g. polycrystalline alumina (PCA), yttrium aluminum garnet (YAG), aluminum nitride (AIN), fused silica, or any other crystalline or glassy transparent material that can withstand an elevated temperature of the arc chamber during operation of the lamp. The arc tube also contains electrodes and electrode assemblies serving as an electrical current lead-through between the discharge plasma in the arc chamber and the driving electronics at an external location. Depending on the positioning of the electrode assemblies, the arc tube can be double-ended or single-ended. The shape of the arc tube is either cylindrical or ball-shaped.

An outer bulb or envelope may surround the arc tube. The outer bulb or envelope serves as a means for arc tube thermal management, a protection against oxidation of metal lead-wire components and contamination of the outer surface of the arc tube, and provides for UV filtering of the light emitted from the arc tube. This outer bulb also contains electrical lead-through elements either at both ends in a double-ended structure or only at one end in a single-ended structure. The outer bulb can also be completely omitted, providing its roles are solved by other technical solutions. One solution can be a coating on the outer surface of the arc tube itself, which coating can be used for UV filtering and/or as an auxiliary electrode assuming the coating is electrically conductive. The electrically conductive coating may be used as the lead-wire for the second electrode in a double-ended arc tube, in which case back-lead wire in not required.

Since the three elements of the HID LSM (HID light source, optics and electronics) are optimized together as a complete system and not independently of each other, beam properties and aiming accuracy may be improved by the fact that the optical alignment of the arc tube can be performed in the optical unit itself in some embodiments. The structural elements for the optical alignment of the arc tube are restricted to the lamp base in the current pre-focused lamp constructions. In the case of the proposed HID light source module, the lamp base can completely be omitted, and the optical alignment is performed in the optical module containing the structural components for optical alignment of the arc tube.

The driving electronics specifically developed for and optimized along with the arc tube of the HID lamp component, can also be positioned at or joined to the HID light source module itself. It may be fully integrated, and a fully integrated HID LSM requires only a voltage input (a DC voltage input in automotive or AC mains voltage input in commercial applications), in which case the voltage converter, the driving unit and the igniter are included in the same housing. Alternatively, there may be used a separate power supply, and only the driving unit and the igniter is placed in the housing of the HID light source module. As a third option, only the igniter is disposed in the housing. Finally, the electronic unit can completely be separated from the housing of the HID LSM.

The optical system of the HID light source module may consist of a lens and front window or at least one of these, a light shield for beam cut-off and a reflector with reflecting mirror surface. The mirror surface can be parabolic, ellipsoidal or any continuous surface, or can be faceted. Some of the listed components can be left out or built together.

Finally, the HID light source module may contain additional components for supporting and pivoting the light source module or any other auxiliary components, for example motor drives, shafts.

The HID LSM can be installed in automotive headlamp units, working area beam illuminators, or any other lighting units fitted to a specific lighting application. Useful life of the HID light source in the light source module have to be long enough so as it can be considered an "end of life" component. For this reason, the HID lamp source in the HID LSM unit may be based on ceramic metal halide technology, but other HID technology options can also be tolerated if the life of the lamp is acceptably long. However, the HID LSM can also be replaceable as a complete unit or serviceable like other electro-optical units, if yet required.

Figure 3:
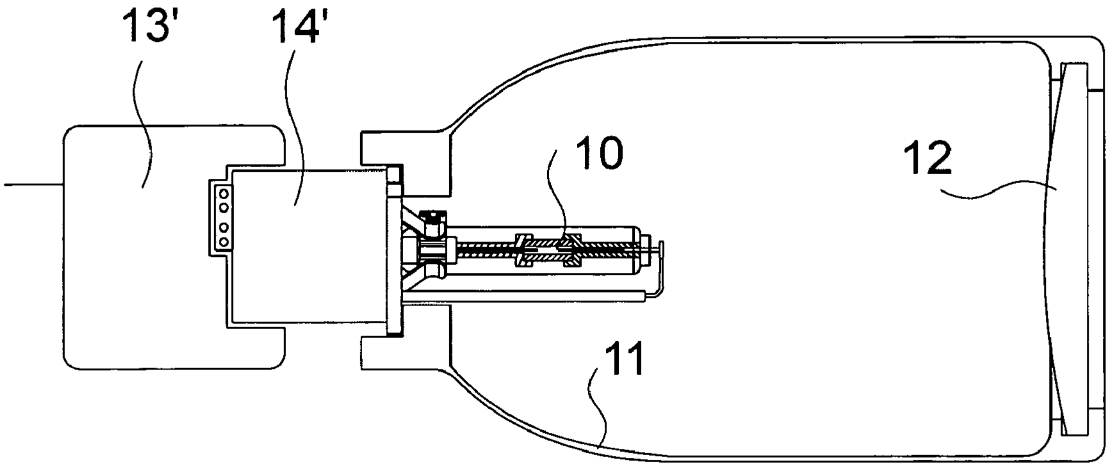
FIG. 3 is a partly cross sectional side view of a HID light source module with a replaceable HID light source with a different standard base and non-standard optical parameters.

Referring now to FIGS. 1 and 3, there is shown a light source module in a partly cross sectional side view. The light source module comprises a high intensity discharge (HID) light source 10, optical elements including at least a reflector 11 and a lens 12 for redirecting and focusing the light emanating from said light source 10 and electronic elements 13 for supplying said light source with voltage and current of a predetermined waveform and magnitude. The light source has an arc tube made of ceramic material with an outer envelope and the optical parameters of the light source may be at least partially different from the standard parameters of a light source of identical type. The electrical parameters of the HID light source 10 are compatible with the standard parameters, for example voltage, wattage, run-up, and hot re-strike parameters. In order to provide an illuminating beam compatible with the standard, the optical elements are adjusted to the optical parameters of said light source. This adjustment can be done in many different ways, for example by modification of the reflector geometry, use of apertures and baffles. In the embodiment shown in FIGS. 1 and 3, the non-standard light source is provided with a base 14 or cap compatible with a base standard of D2 type lamps (FIG. 1) or D1 type lamps (FIG. 3) and the light source is optically aligned to said base. This optical alignment does not necessarily mean that each optical parameter of the HID light source meets the requirements of the standard. For example, the electrodes of the arc tube may have a position meeting these requirements, however the brightness distribution of the arc may be out of the standard. The optical elements, for example the reflector with its reflecting surface, can be adjusted to these optical parameters that will result in an illuminating beam compatible with the standard. The light source 10 with its standard base 14 is releasably fixed in the reflector 11, which has a neck portion 17 compatible with the same base standard. As the HID light source base assembly has a releasable connection with the reflector unit and the electronic unit, the replacement of the light source is ensured with light sources of identical construction.

The HID light source of this example has standard electrical parameters, therefore the electronic unit for supplying the light source with voltage and current of a predetermined waveform and magnitude can be any electronic unit built in accordance with the same standard. The standard base of the light source 10 shown in FIG. 1 has standard connecting means to be connected to an output connector means of the electronic unit 15 comprising an igniter. The electronic unit 15 is connected with an input to an output of an electronic unit 13 comprising a ballast circuit, which is connected with an input to a power supply. In the embodiment shown in FIG. 3, the HID light source 10 has a standard base 14', which already comprises an igniter circuit and can be connected with an input to an output of electronic unit 13' comprising a ballast circuit which is connected with an input to a power supply.

Figure 2:
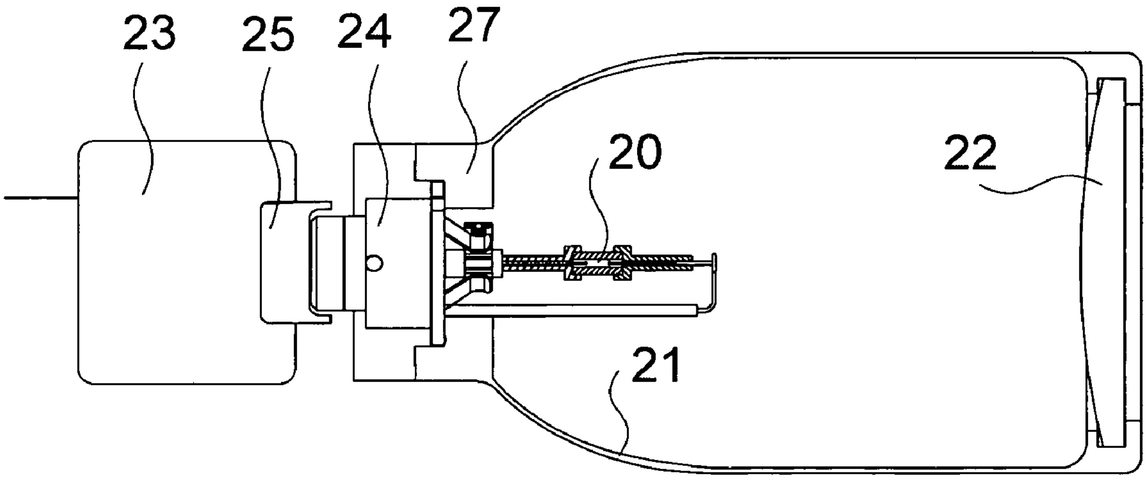
FIG. 2 is a partly cross sectional side view of a HID light source module with a non-replaceable HID light source with a standard base and non-standard optical parameters.
Figure 4:
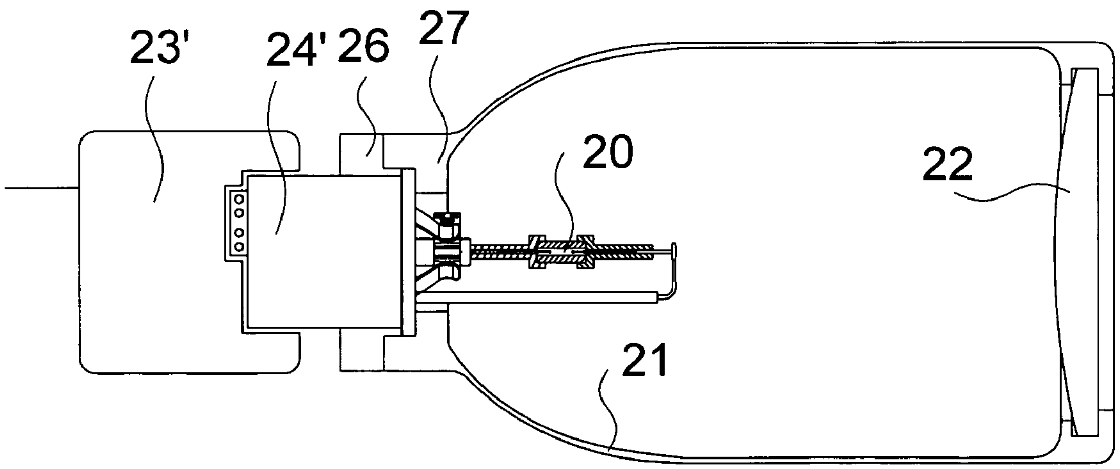
FIG. 4 is a partly cross sectional side view of a HID light source module with a non-replaceable HID light source with a different standard base and non-standard optical parameters.

In an other example shown in FIGS. 2 and 4 partly in a cross sectional side view, the light source module comprises a high intensity discharge (HID) light source 20, optical elements including at least a reflector 21 and a lens 22 for redirecting and focusing the light emanating from said light source 20 and electronic elements 23 for supplying said light source with voltage and current of a predetermined waveform and magnitude. The light source 20 has an arc tube made of ceramic material without an outer envelope and has optical parameters, which are at least partially different from the standard parameters of a light source of identical type. The electrical parameters of the HID light source 20 are compatible with the standard parameters, for example voltage, wattage, run-up, hot re-strike parameters. In order to provide an illuminating beam compatible with the standard, the optical elements are adjusted to the optical parameters of said light source. This adjustment is accomplished in the embodiments shown in FIGS. 2 and 4 with a light source 20 provided with a base 24 compatible with a base standard of D2 type lamps (FIG. 2) or D1 type lamps (FIG. 4), and aligned optically to the said base. The light source is permanently fixed to the reflector, which has a neck portion non-compatible with the same base standard. The optically aligned position of the HID light source to the reflector is accomplished prior to the permanent fixing. If necessary, an additional optical alignment to the reflector may be carried out before the permanent fixing step. The permanent fixing may be accomplished in many known ways, for example by gluing a neck portion 27 of the reflector unit 21 and a counterpart unit 26, which fills the gap between the neck portion and the standard base 24 of the HID light source and forms a closing cup or cover of the light source reflector assembly. The permanent fixing of the light source base assembly to the reflector unit will not allow the replacement of the light source, however optical alignment remains unchanged during the lifetime of the light source module.

The HID light sources of the examples shown in FIGS. 2 and 4 have standard electrical parameters, therefore the electronic unit 23 and 23' for supplying the light source 20 with voltage and current of a predetermined waveform and magnitude can be any electronic unit built according the same standard. The standard base of the light source 20 shown in FIG. 2 has standard connecting means to be connected to an output connector means of electronic unit 25 comprising an igniter. The electronic unit 25 is connected with an input to an output of electronic unit 23 comprising a ballast circuit, which is connected with an input to a power supply. In the embodiment shown in FIG. 4, the HID light source 20 has a standard base 24' which already comprises an igniter circuit and can be connected with an input to an output of electronic unit 23' comprising a ballast circuit, which is connected with an input to a power supply.

Figure 5:
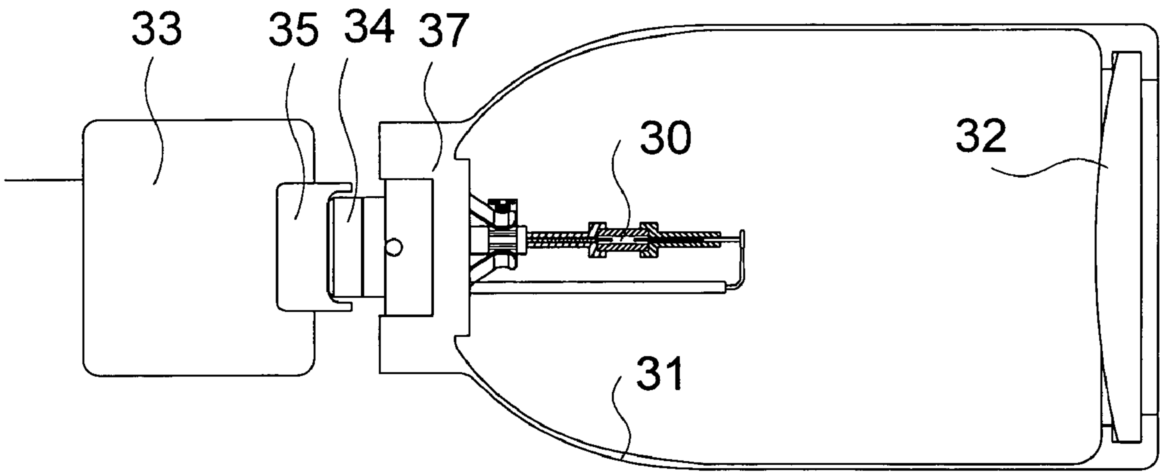
FIG. 5 is a partly cross sectional side view of a HID light source module with a HID light source integrated in the optical module with a standard base and non-standard optical parameters.
Figure 6:
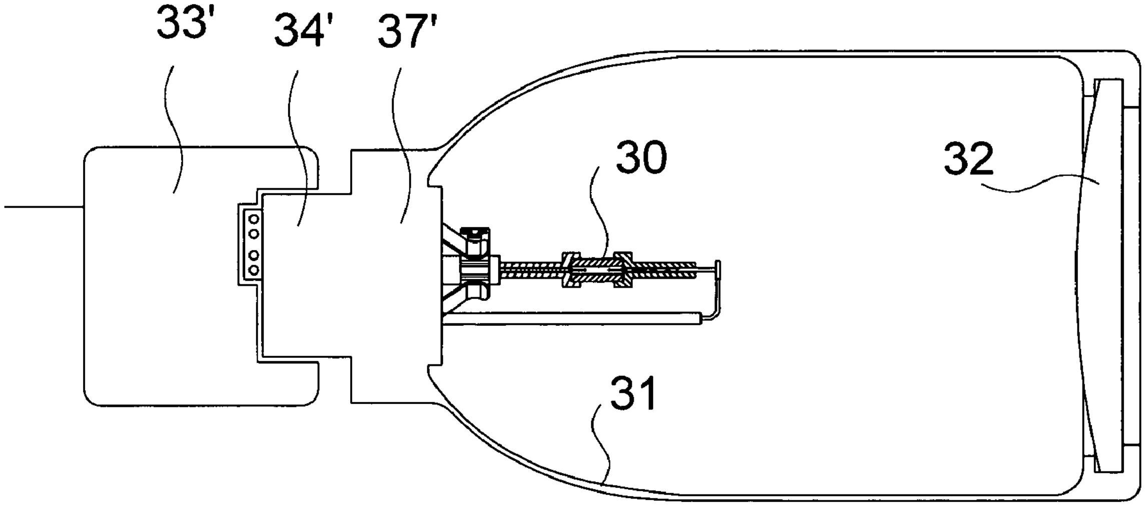
FIG. 6 is a partly cross sectional side view of a HID light source module with a HID light source integrated in the optical module with a standard connector and non-standard optical parameters.

In FIGS. 5 and 6, further examples of the invention are shown, where a light source 30 has a ceramic discharge vessel without an outer envelope. Similarly to the previous examples, the light source module comprises a high intensity discharge (HID) light source 30, optical elements including at least a reflector 31 and a lens 32 for redirecting and focusing the light emanating from said light source 30 and electronic elements 33 and 35 for supplying said light source with voltage and current of a predetermined waveform and magnitude. The light source has optical parameters, which are at least partially different from the standard parameters of a light source of identical type. The electrical parameters of the HID light source 30 are compatible with the standard parameters, for example voltage, wattage, run-up, and hot re-strike parameters. In order to provide an illuminating beam compatible with the standard, the optical elements are adjusted to the optical parameters of said light source. In order to adjust the optical elements to the at least partly non-standard light source, the light source and the reflector unit are positioned relative to each other in a predetermined way to provide the standard output illuminating beam pattern and fixed permanently in this position. This step is also referred to as optical alignment. The predetermined position of the light source relative to the reflector unit may be determined for example by measuring the output light beam while varying the position of the light source relative to the reflector unit. This determining step however has to be carried out once for each type of reflector and light source. The HID light sources of the examples shown in FIG. 5 and 6 have standard electrical parameters, therefore the electronic unit for supplying the light source with voltage and current of a predetermined waveform and magnitude can be any electronic unit built according the same standard.

The light source shown in FIG. 5 is provided with a base. This base has a mechanical and electrical coupling portion identical with the same base portion of a standard D2 base, and is connected to the reflector unit 31 comprising a non-standard neck portion 37 in a permanent way, for example by gluing or any other known permanent fixture. The standard base 34 of the light source 30 has a standard connecting means to be connected to an output connector means of electronic unit 35 comprising an igniter. The electronic unit 35 is connected with an input to an output of electronic unit 33 comprising a ballast circuit, which is connected with an input to a power supply. In the embodiment shown in FIG. 6, the HID light source 10 has a non-standard base 34' with a standard D1 connector part (D1 like base), which already comprises an igniter circuit and can be connected with an input to an output of electronic unit 33' comprising a ballast circuit which is connected with an input to a power supply. In this embodiment the reflector unit 31, the non-standard base 34' of the light source and the igniter circuit of the light source module are integrated into one unit. The permanent fixing of the light source base assembly to the reflector unit will not allow the replacement of the light source, however optical alignment remains unchanged during the lifetime of the light source module.

The examples shown in FIGS. 7 to 10 relate to light source modules with HID light sources having standard optical parameters and therefore also an optical module compatible with the standard light sources. The optical module comprises at least a reflector 41 and 51 and a lens unit 42 and 52. The light sources 40 in the embodiments shown in FIGS. 7 to 9 have a silica fuse arc tube with an outer envelope. These light sources may be provided with a base 44, which is adapted to be connected to the neck portion 47 and 57 of the reflector unit 41 and 51, respectively. This connection may be either a releasable or a non-releasable connection. A releasable connection provides for an easy replacement of the HID light source, and the non-releasable connection ensures optical alignment of the light source to the reflector unit during the lifetime of the light source module.

Figure 10:
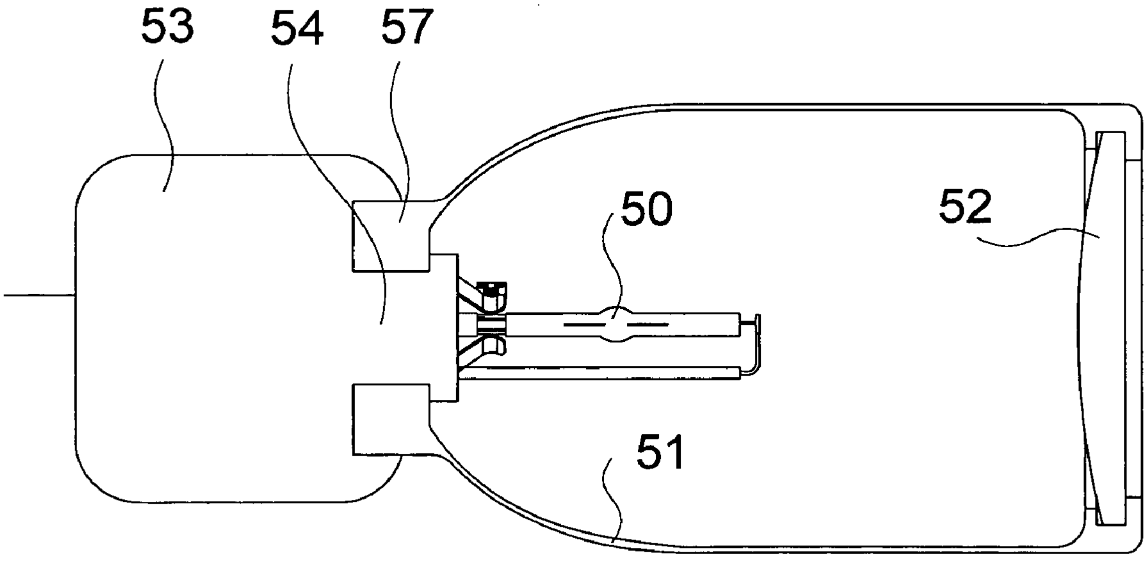
FIG. 10 is a partly cross sectional side view of a HID light source module with a standard optical module, a HID light source with non-standard electrical parameters, and electrical components integrated in one unit.

The light source 50 depicted in FIG. 10 comprises also a silica fuse discharge vessel, however without an outer envelope. This light source has contact terminals 54 that are connected to an electronic unit 53, which is fixed to a reflector unit 51 by a neck portion 57 in order to form an integrated light source module. The permanent fixing of the light source base assembly to the reflector unit will not allow the replacement of the light source, however optical alignment remains unchanged during the lifetime of the light source module.

The HID light sources of the examples of FIGS. 7 to 10 have electrical parameters at least partly different from standard parameters of light sources of identical type, therefore the electronic unit for supplying the light source with voltage and current of a predetermined waveform and magnitude has to be designed and constructed to have electrical parameters adjusted to the lights source. For each type of light source designed for a special field of use and having different electrical parameters, an individual type of electronic unit has to be designed in order to provide an illuminating beam pattern with a predetermined intensity and starting properties. These electronic units will be suitable for supplying said light sources with voltage and current of an optimum waveform, frequency and magnitude. The following examples show different possible embodiments of such electronic units and their connection to the light sources.

Figure 7:
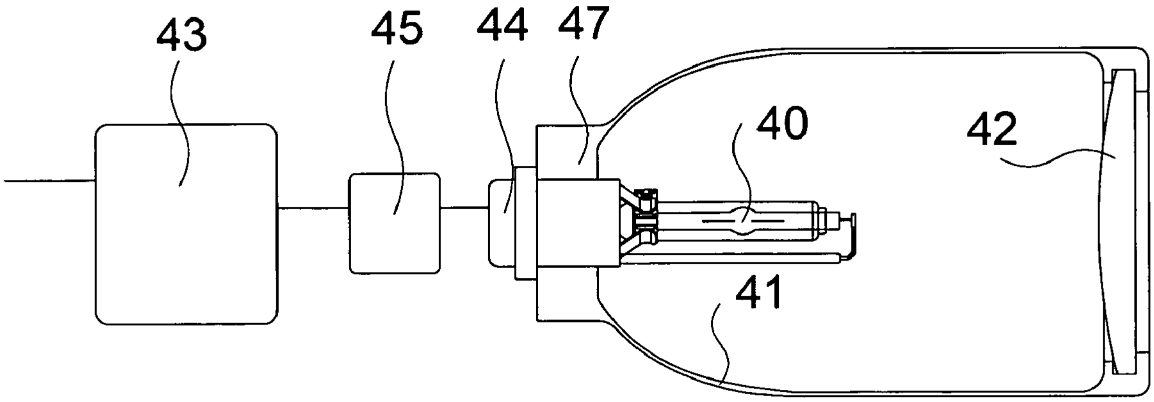
FIG. 7 is a partly cross sectional side view of a HID light source module with a standard optical module, a HID light source with non-standard electrical parameters, and separate driving electronic components.

In the embodiment shown in FIG. 7, the electronic elements are allocated in an electronic unit 43 comprising a ballast circuit for converting the voltage of a power supply into a high frequency voltage for steady-state operation of said light source and in a further electronic unit 45 comprising an igniter circuit for generating pulses for ignition of said light source. In this embodiment of the light source module, the ballast and the igniter form a distant unit, which is connected to contact terminals of said light source through a cable. The base of the light source 40 shown in FIG. 7 has standard connecting means to be connected to an output connector means of the electronic unit 45 comprising an igniter. The electronic unit 45 is connected with an input to an output of the electronic unit 43 comprising a ballast circuit, which is connected with an input to the power supply.

Figure 8:
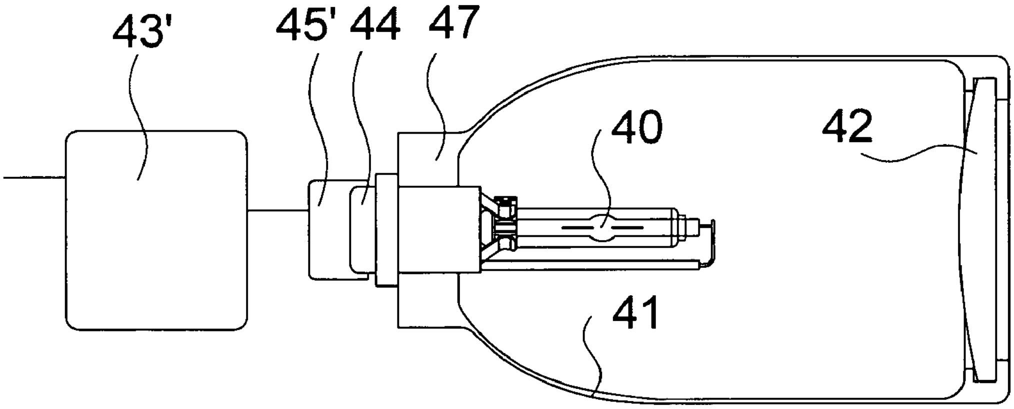
FIG. 8 is a partly cross sectional side view of a HID light source module with a standard optical module, a HID light source with non-standard electrical parameters, connected directly to an igniter and indirectly to a separate ballast circuit.

FIG. 8 shows a HID light source module with a standard optical module, a HID light source with at least partially non-standard electrical parameters, connected directly to an electronic unit 45' comprising an igniter and indirectly to a separate electronic unit 43' comprising a ballast circuit. The HID light source 40 has a base 44 which is connected directly through a standard connector to contact terminals of the electronic unit 45' comprising an igniter circuit. An input of the electronic unit 45' is connected through a cable to an output of the distant electronic unit 13' comprising a ballast circuit which is connected with an input to the power supply through a further cable.

Figure 9:
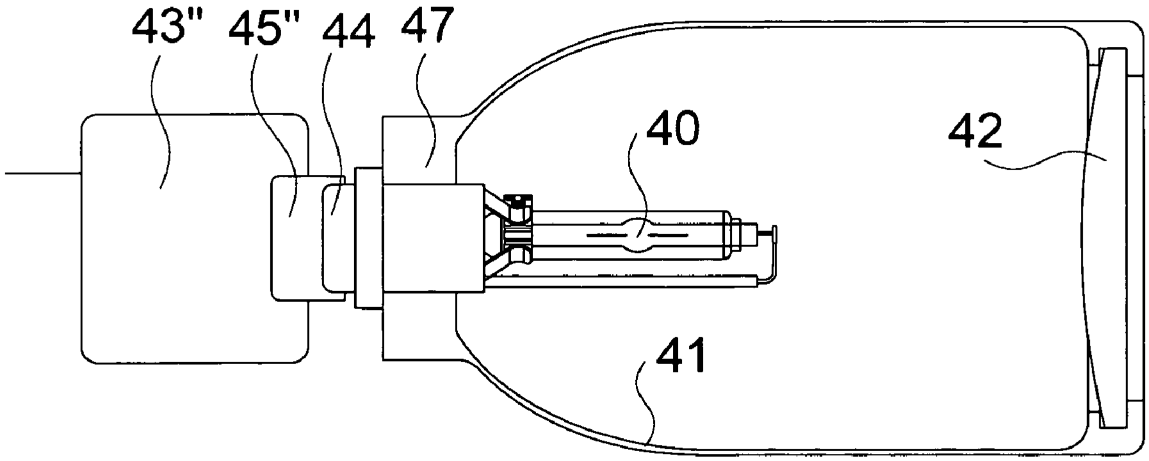
FIG. 9 is a partly cross sectional side view of a HID light source module with a standard optical module, a HID light source with non-standard electrical parameters, connected directly to an igniter and a ballast circuit.

In the embodiment shown in FIG. 9, the HID light source 40 is provided with a base 44 comprising contact terminals connected directly to an electronic unit 45' comprising an igniter for generating pulses for ignition of said light source. The electronic unit 45" also comprises contact terminals to be connected directly to an electronic unit 43" comprising a ballast circuit for converting voltage of a power supply into a high frequency voltage for steady-state operation of said light source. The electronic unit 43" is connected to a distant power supply (not shown) through a cable. The electronic units 43" and 45" may also designed to build a single integrated electronic unit comprising both the ballast and the igniter circuit.

In a further exemplary embodiment of the invention shown in FIG. 10, the HID light source 50 is provided with contact terminals 54 connected directly to an electronic unit 53 comprising an igniter for generating pulses for ignition of said light source and a ballast circuit for converting voltage of a power supply into a high frequency voltage for steady-state operation of said light source. The electronic unit 53 is connected to a distant power supply (not shown) through a cable.

In this embodiment, the HID light source 50, the optical module and the electronic unit 53 form a single integrated HID light source module.

In the embodiments shown in FIGS. 11 to 14, further examples are provided for the invention, in which the light source module comprises a HID light source, optical elements including at least a reflector and a lens for redirecting and focusing the light emanating from said light source and electronic elements for supplying said light source with voltage and current of a predetermined waveform and magnitude. The light source with an arc tube made of silica glass or ceramic material with or without an outer envelope has optical parameters and electrical parameters being at least partially different from standard parameters of a light source of identical type. In order to provide an illuminating beam compatible with standard, said optical elements are adjusted to the optical parameters of said light source and said electronic elements are adjusted to the electrical parameters of said light source. Optical alignment of the light source to the base and/or to the optical module and electrical adjustment of the electronic unit is accomplished as described in more detail with reference to the above examples.

Figure 11:
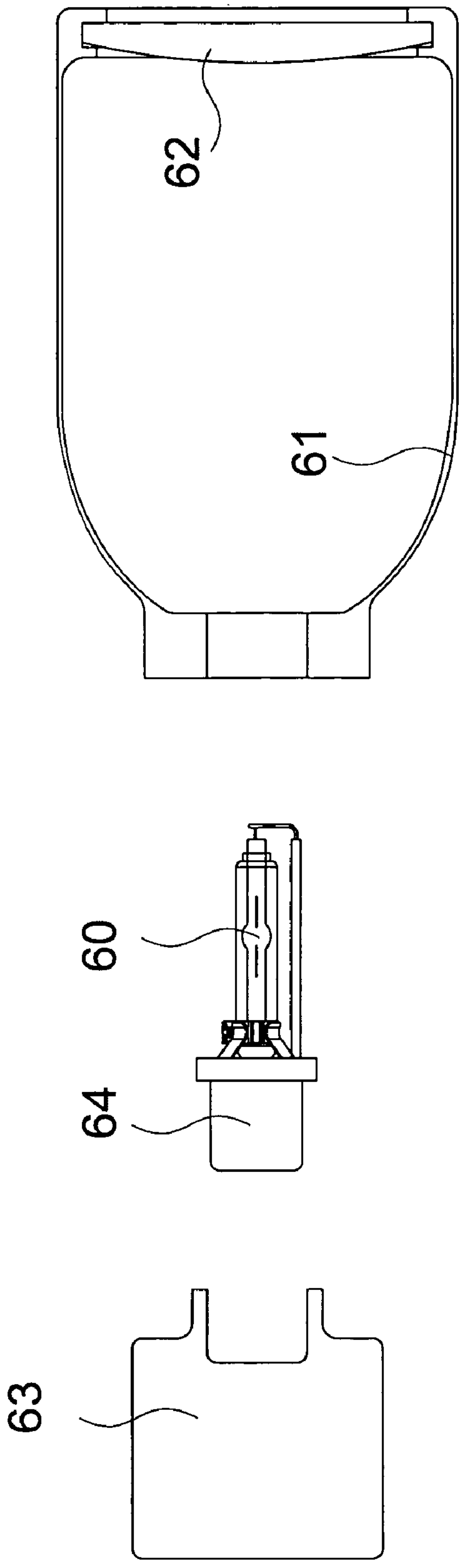
FIG. 11 is a partly cross sectional side view of a HID light source module with a HID light source with non-standard optical and electrical parameters replaceably connected to an electrical and an optical module.

The HID light source module shown in FIG. 11, comprises a HID light source 60 with a fused silica discharge vessel and an outer envelope. The optical and electrical parameters of the light source are at least partially different from the standard parameters of a light source of the same type. In order to provide an illuminating beam compatible with standard, the optical module comprising at least a reflector 61 and a lens 62 is adjusted to the optical parameters of said light source and the electronic unit 63 is adjusted to the electrical parameters of the light source 60. The electronic unit 63, the HID light source 60 and the optical module are designed in this example as individual units with compatible interfaces, therefore all of the units are free replaceable with any other unit of the same type.

Figure 12:
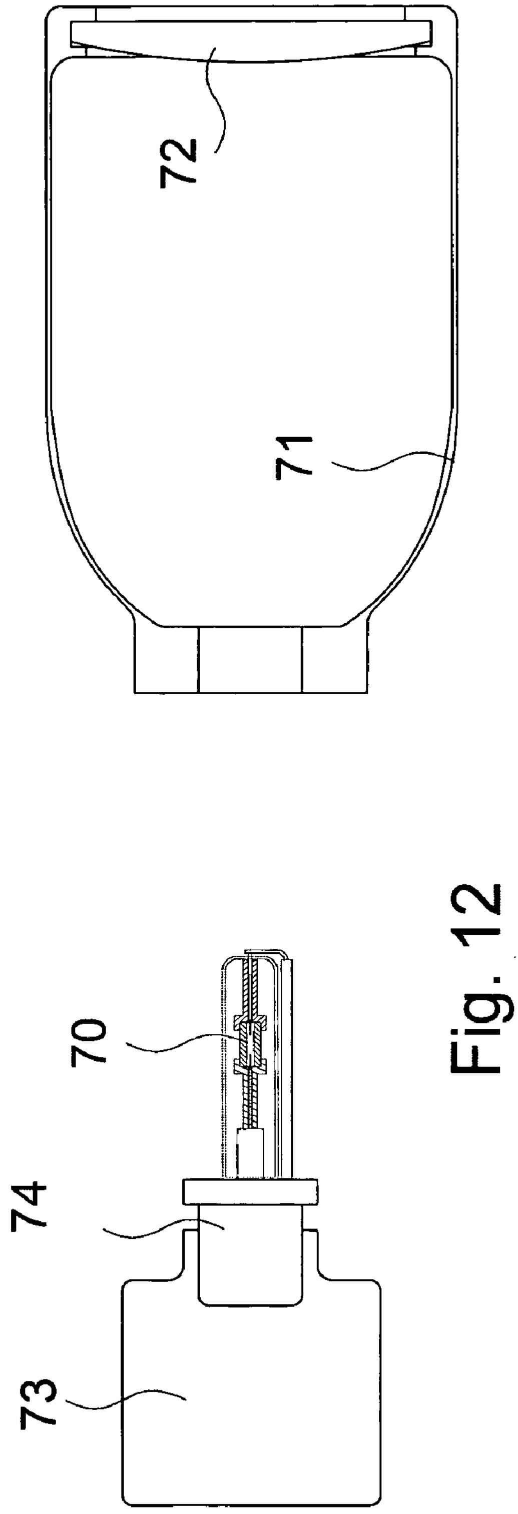
FIG. 12 is a partly cross sectional side view of a HID light source module with a HID light source with non-standard optical and electrical parameters connected fix to an electrical and replaceably to an optical module.

The HID light source module shown in FIG. 12, comprises a HID light source 70 with a ceramic discharge vessel without an outer envelope. The optical and electrical parameters of the light source are at least partially different from the standard parameters of a light source of the same type. In order to provide an illuminating beam compatible with standard, the optical module comprising at least reflector 71 and a lens 72 is adjusted to the optical parameters of said light source and the electronic unit 63 is adjusted to the electrical parameters of the light source 70. The electronic unit 73 and the HID light source 60 form an integrated unit which is connected to the optical module in a replaceable way.

Figure 13:
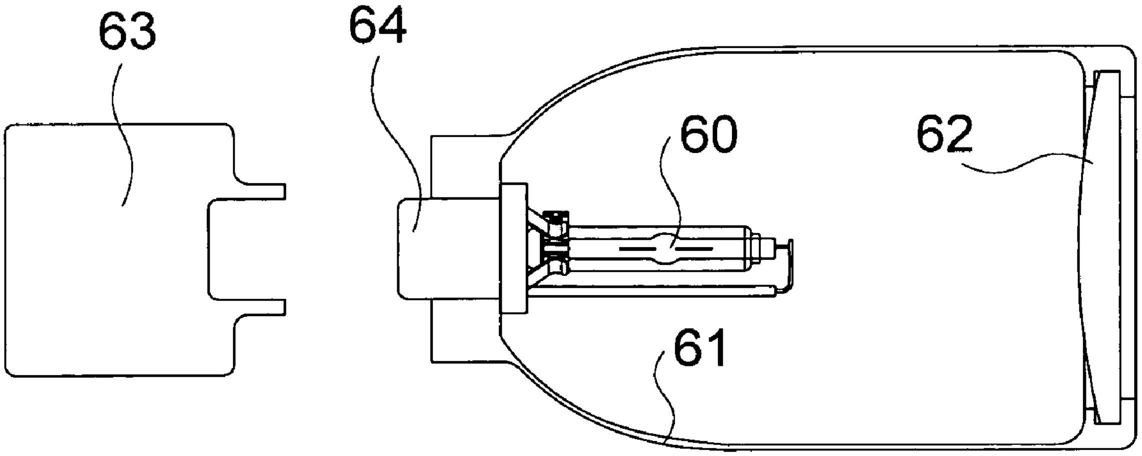
FIG. 13 is a partly cross sectional side view of a HID light source module with a HID light source with non-standard optical and electrical parameters connected replaceably to an electrical and fixed to an optical module.

The HID light source module shown in FIG. 13 comprises a HID light source 60 with a fused silica discharge vessel and an outer envelope. The optical and electrical parameters of the light source are at least partially different from the standard parameters of a light source of the same type. In order to provide an illuminating beam compatible with standard, the optical module comprising at least reflector 61 and a lens 62 is adjusted to the optical parameters of said light source and the electronic unit 63 is adjusted to the electrical parameters of the light source 60. The HID light source 60 and the optical module form an integrated unit, which is connected to the electronic unit 63 in a replaceable way.

Figure 14:
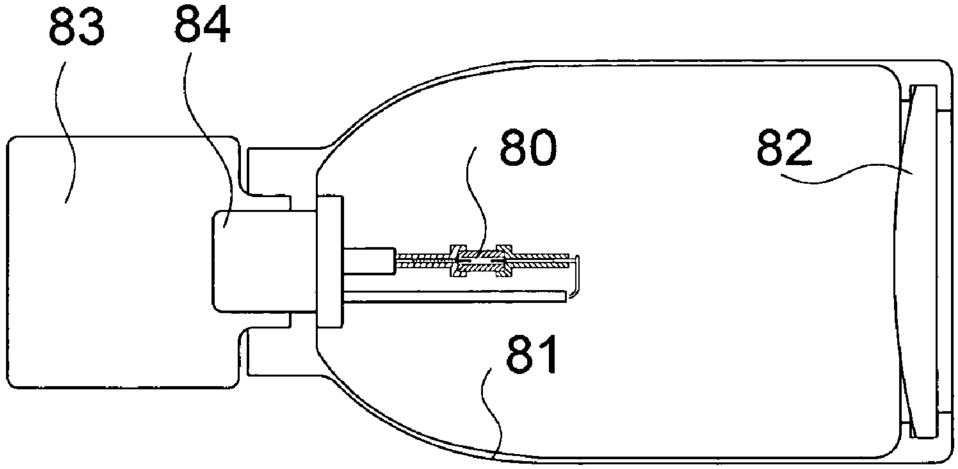
FIG. 14 is a partly cross sectional side view of a HID light source module with a HID light source with non-standard optical and electrical parameters integrated with an electrical and an optical module.

The HID light source module shown in FIG. 14 comprises a HID light source 80 with a ceramic discharge vessel without an outer envelope. The optical and electrical parameters of the light source are at least partially different from the standard parameters of a light source of the same type. In order to provide an illuminating beam compatible with standard, the optical module comprising at least reflector 81 and a lens 82 is adjusted to the optical parameters of said light source and the electronic unit 83 is adjusted to the electrical parameters of the light source 80. The electronic unit 83, the HID light source 80 and the optical module form one integrated unit, which has no replaceable part, however provides for an optical alignment of the light source to the reflector throughout the lifetime of the light source module.

The proposed HID light source module provides for a substantial freedom for the manufacturers to produce low cost and high performance light source modules having parts with parameters at least partly different from the standard parameters of an identical type. These low cost and high performance parts can then be combined with each other in many different ways. Parallel optimization of all of the HID LSM components results in improved beam properties, since optical alignment and interfacing of the HID light source and beam redirecting optics is not limited by standardization constraints, in a simplified optical system due to lacking of safety related or interfacing components between the light source and the optical system, an in cheaper and simplified electronics due to matching the architecture and properties of the driving electronics to the specific non-standardized light source characteristics. In addition, the proposed HID light source module may be smaller and may have less weight compared to the systems of same purpose but built up from individually standardized components, since interfacing and other structural and safety components are not needed any longer.

The invention is not limited to the shown and disclosed embodiments, but other elements, improvements and variations are also within the scope of the invention. For example, it is clear for those skilled in the art that the light source may have a single-ended electrode configuration or a double-ended electrode configuration with the same effect. The reflector also may have different forms and structure in order to redirect light emitted by the light source. Conversely, the position structure of the lens may also vary according to the special task to be performed by the light source module of the invention. Finally, the HID light source module may contain additional components for supporting, pivoting the light source module or any other auxiliary components such as motor drives, shafts, beam cut-off shutters, etc.

The invention claimed is:

1. A light source module comprising a) a high intensity discharge light source;

b) optical elements including at least a reflector for redirecting and focusing the light emanating from said light source;

c) electronic elements for supplying said light source with voltage and current of a predetermined waveform and magnitude;

d) said light source having optical parameters being at least partially different from standard parameters of a light source of identical type and electrical parameters compatible with standard parameters of a light source of identical type;

e) said optical elements being adjusted to the optical parameters of said light source so that the light source module provides an illuminating beam compatible with the standard.

2. The light source module of claim 1, in which said light source is provided with a base compatible with a base standard, said light source is optically aligned to said base, and said light source is releasably fixed in the reflector, which has a neck portion compatible with the same base standard.

3. The light source module of claim 1, in which said light source is provided with a base compatible with a base standard, said light source is optically aligned to said base, and said light source is permanently fixed in the reflector, which has a neck portion non-compatible with the same base standard.

4. The light source module of claim 3, in which said light source is glued in the reflector.

5. The light source module of claim 1, in which said light source is built together with the reflector and optically aligned to the reflector.

6. The light source module of claim 1, in which said light source is provided with a base compatible with a base standard, said adjustment to said optical elements to the optical parameters of said light source being performed without using said base as a reference.

7. A light source module comprising a) a high intensity discharge light source;

b) optical elements including at least a reflector for redirecting and focusing the light emanating from said light source;

c) electronic elements for supplying said light source with voltage and current of a predetermined waveform and magnitude;

d) said light source having optical parameters compatible with standard parameters of a light source of identical type, and electrical parameters being at least partially different from standard parameters of a light source of identical type; and e) said electronic elements being adjusted to the electrical parameters of said light source so that the light source module provides an illuminating beam compatible with the standard.

8. The light source module of claim 7, in which said electronic elements comprise a ballast for converting voltage of a power supply into a high frequency voltage for steady-state operation of said light source, and an igniter for generating pulses for ignition of said light source.

9. The light source module of claim 8, in which the ballast and the igniter form a distant unit, which is connected to contact terminals of said light source through a cable.

10. The light source module of claim 8, in which the ballast is a distant unit, which is connected through a cable to the igniter fixed to said light source and connected directly to contact terminals thereof.

11. The light source module of claim 8, in which the ballast and igniter form an integrated electronic unit, which is fixed to said light source and connected directly to contact terminals thereof.

12. The light source module of claim 8, in which the ballast and igniter form an integrated electronic unit, which is fixed to said light source and connected directly to contact terminals thereof, and the integrated electronic unit, said light source and said optical elements form one integrated light source module.

13. A light source module comprising a) a high intensity discharge light source;

b) optical elements including at least a reflector for redirecting and focusing the light emanating from said light source;

c) electronic elements for supplying said light source with voltage and current of a predetermined waveform and magnitude;

d) said light source having optical parameters and electrical parameters being at least partially different from standard parameters of a light source of identical type; and e) said optical elements being adjusted to the optical parameters of said light source and said electronic elements being adjusted to the electrical parameters of said light source so that the light source module provides an illuminating beam compatible with the standard.

14. The light source module of claim 13, in which said light source is provided with a base, and said light source is optically aligned to the base.

15. The light source module of claim 14, in which said electronic elements, said optical elements and said light source form separate units.

16. The light source module of claim 14, in which said light source and said electronic elements are fixed to each other and the optical elements form a separate unit.

17. The light source module of claim 13, in which said electronic elements form a separate unit and said light source and said optical elements are fixed to each other.

18. The light source module of claim 17, in which the light source is optically aligned to the reflector.

19. The light source module of claim 13, in which said light source, said optical elements and said electronic elements form one integrated unit, and the light source is optically aligned to the reflector.

20. The light source module of claim 13, in which said light source has an arc tube made of ceramic material.

21. The light source module of claim 13, in which said light source has an arc tube made of fused silica.

22. The light source module of claim 13, in which said light source has a single-ended electrode configuration.

23. The light source module of claim 13, in which said light source has a double-ended electrode configuration.

24. The light source of claim 13, in which said light source has an arc tube with outer envelope.

25. The light source of claim 13, in which said light source has an arc tube without outer envelope.

26. The light source module of claim 13, in which said light source is provided with a base compatible with a base standard, said adjustment to said optical elements to the optical parameters of said light source being performed independent of said base.

* * * * *